United States Patent [19]

Kogame

[11] Patent Number: 5,382,404
[45] Date of Patent: Jan. 17, 1995

[54] METHOD OF CUTTING OUT A PORTION OF A WEAK SHEET

[75] Inventor: Toshihiko Kogame, Kyoto, Japan

[73] Assignee: Murata Manufacturing Co., Ltd., Kyoto, Japan

[21] Appl. No.: 77,944

[22] Filed: Jun. 15, 1993

Related U.S. Application Data

[63] Continuation of Ser. No. 347,498, May 4, 1989, abandoned.

[51] Int. Cl.6 .................. B28B 11/16; B26D 7/06
[52] U.S. Cl. ........................... 264/547; 83/23; 83/100; 264/145; 264/153; 264/544
[58] Field of Search ............... 264/145, 153, 500, 547, 264/553, 571; 83/23, 100; 294/64.3; 271/103; 414/676; 279/3; 269/21

[56] References Cited

U.S. PATENT DOCUMENTS 4,185,814  1/1980  Buchmann et al. ............... 271/108
4,587,068  5/1986  Borase et al. ..................... 264/63

FOREIGN PATENT DOCUMENTS 59-44553   3/1984  Japan .
189211     9/1985  Japan .
61-217627  9/1986  Japan .

Primary Examiner—Christopher A. Fiorilla
Attorney, Agent, or Firm—Ostrolenk, Faber, Gerb & Soffen

[57] ABSTRACT

A ceramic green sheet for making a laminated ceramic capacitor is formed on an upper surface of a carrier film and carried onto a surface plate while maintaining adhesion between the carrier film and the ceramic green sheet. Thereafter a cutting line having a closed outline is defined in the ceramic green sheet, and a cut sheet enclosed by the cutting line is removed from the green sheet by a pickup apparatus having a punching edge at its periphery and provided with a suction head at a portion of the pickup apparatus enclosed by the punching edge.

20 Claims, 3 Drawing Sheets

METHOD OF CUTTING OUT A PORTION OF A WEAK SHEET

This is a continuation of application Ser. No. 07/347,498 filed May 4, 1989, now abandoned.

BACKGROUND OF THE INVENTION

1. Field of the Invention

The present invention relates to a method of cutting out a cut sheet having constant dimensions from a weak sheet, and more particularly, it relates to a method of cutting out a cut sheet from a ceramic green sheet which is to be employed for making a laminated ceramic capacitor, for example.

2. Description of the Background Art

In general, a laminated ceramic capacitor comprises a plurality of stacked ceramic sheets, a plurality of internal electrodes which are opposed to each other on opposite sides of the respective ceramic sheets and a pair of external electrodes provided on a pair of opposite end surfaces of the laminate formed by the plurality of ceramic sheets. The plurality of internal electrodes are electrically connected to respective ones of the external electrodes in an alternate manner.

A conventional laminated ceramic capacitor has been generally manufactured in the following manner: A ceramic material in the form of slurry is applied onto a carrier film (base film) of polyester, for example, by a coating method, such as a doctor blade method in uniform thickness. Then the ceramic material provided on the carrier film is dried. Thus, a ceramic green sheet is formed on the carrier film. Then, an internal electrode is printed on the surface of the ceramic green sheet by screen printing. Then the internal electrode, the carrier film and the ceramic green sheet are passed through a drying furnace to be dried. Thereafter the ceramic green sheet 3 is separated from the carrier film 1 by a suction roller 2, as shown in FIG. 4. The separated ceramic green sheet 3 is placed on an endless belt 4, which is partially shown in FIG. 4, and carried along as indicated by arrow 5, to be then positioned on a surface plate 6. The belt 4 is formed by a thin plate of a metal such as nickel, and provided with a large number of pores 7, as shown in FIG. 5. The surface plate 6 is provided with a plurality of suction holes 8. Negative pressure is applied to the suction holes 8 to draw the ceramic green sheet 3 downward by suction provided through the pores 7, thereby to locate the ceramic green sheet 3 securely on the surface plate 6.

As shown in FIG. 4, a vertically movable pickup apparatus 10 is positioned above the ceramic green sheet 3. The pickup apparatus 10 has a punching edge 11 at its periphery and is provided with a suction head 12 in a portion thereof enclosed by the punching edge 11. The suction head 12 is provided with a plurality of suction holes 13.

When the pickup apparatus 10 is downwardly moved as shown in FIG. 5, the punching edge 11 defines a cutting line having a closed outline, that is, a continuous cut, in the ceramic green sheet 3. Then the pickup apparatus 10 is upwardly moved so that a cut sheet 3a, which is in contact with the lower surface of the suction head 12 and enclosed by the aforementioned cutting line, is taken out from the remaining part of the ceramic green sheet 3.

Thereafter a prescribed number of such cut sheets 3a are stacked and then pressure is applied thereto. A laminate of the sheet cuts 3a thus obtained is cut in dimensions for providing an individual capacitor, if necessary. Then this laminate is fired. Silver paste members are applied to opposite end surfaces of the fired laminate and then baked, thereby to form a pair of external electrodes. A desired ceramic laminated capacitor is obtained in such a manner.

Alternatively, the internal electrode may be alternatively printed after the cut sheet 3a is obtained, by performing cutting as shown in FIG. 4.

In the aforementioned method, the ceramic green sheet 3 is necessarily independently suspended as it is transferred to the belt 4 after being separated from the carrier film 1. That is, the ceramic green sheet 3 is in an unsupported, independent state on both the upstream and downstream sides of the suction roller 2 in the example shown in FIG. 4. As a result, the ceramic green sheet 3 may be deformed, broken or wrinkled if the same is thin, i.e., mechanically weak. Thereafter, it is difficult to obtain the cut sheet 3a with high dimensional accuracy, and hence the production yield of laminated ceramic capacitors is reduced as the result.

Further, this method requires great accuracy of the straightness of the punching edge 11, which is directly brought into contact with the surface of the belt 4 of nickel or the like in order to cut the ceramic green sheet 3. If the punching edge 11 is inferior in straightness, it is not possible to completely cut through the ceramic green sheet 3. Further, the life of the punching edge 11 is reduced since the same is brought into contact with the hard belt 4 when cutting the ceramic green sheet 3 is cut. If the punching edge 11 is chipped, metal scraps may be mixed into the ceramic green sheet 3.

SUMMARY OF THE INVENTION

Accordingly, an object of the present invention is to provide a method of cutting a weak sheet such as a ceramic green sheet, which can reliably cut with a punching edge.

Another object of the present invention is to provide a method of cutting a weak sheet such as a ceramic green sheet, which can extend the life of the punching edge.

According to a feature of the present invention, a weak sheet is first formed on a carrier film. Then the sheet is carried by the carrier film onto a surface plate. The sheet is located on the surface plate by the carrier film in an upwardly directed orientation. A punching edge is applied to the sheet deep enough to at least reach the surface of the carrier film, thereby to define a cutting line having a closed outline in the sheet. A cut sheet defined by the cutting line is then taken out from the remaining part of the sheet by suction.

In a preferred embodiment of the present invention, the weak sheet is a ceramic green sheet, and the step of forming the sheet on the carrier film includes a step of applying ceramic slurry onto the carrier film in uniform thickness. The carrier film preferably has higher shearing stress tolerance as compared with the weak sheet and a degree of hardness which will not cause breakage of the punching edge. Preferably the carrier film is formed of polyester. The carrier film may be coated with a mold release agent on its surface to which the sheet is applied, so that the cut sheet can be easily separated from the carrier film.

The steps of defining the cutting line and taking out the cut sheet cut are preferably carried out by pickup means which has a punching edge in its periphery and is provided with a suction head in a portion enclosed by the punching edge. Such a suction head has a surface which is brought into contact with the cut sheet, and a plurality of suction holes are distributed in this a surface. Particularly in the case of a thin sheet, the suction force acting on the portion of the surface of the suction head which is brought into contact with the cut sheet is preferably stronger in a portion around its outer periphery than in a central portion. To this end, the suction holes which are distributed around the outer periphery of the surface which is in contact with the cut sheet are larger than those distributed around the central portion.

These and other objects, features, aspects and advantages of the present invention will become more apparent from the following detailed description of an embodiment of the present invention when taken in conjunction with the accompanying drawings.

DESCRIPTION OF THE PREFERRED EMBODIMENT

Figure 1:
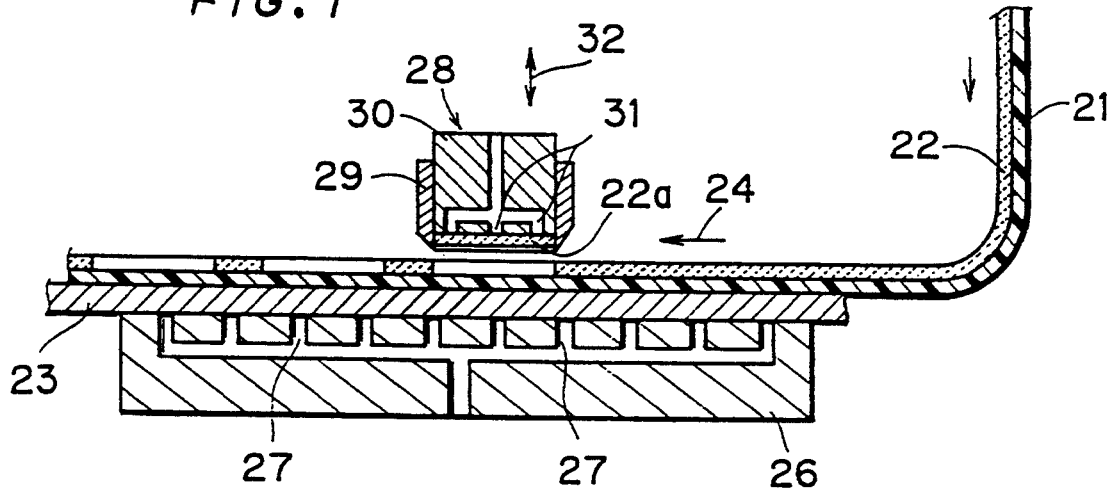
FIG. 1 is a sectional view showing an apparatus for cutting out a cut sheet, for illustrating an embodiment of the present invention.

Referring to FIG. 1, a ceramic green sheet 22 is formed on a carrier film 21 of polyester, for example, by applying ceramic slurry in uniform thickness. A method that may be used for forming the ceramic green sheet 22 on the carrier film 21 is similar to that in the aforementioned conventional case. Adhesion between the carrier film 21 and the ceramic green sheet 22 is preferably suppressed since the same must be separated from each other in a later step. To this end, the carrier film 21 may be previously coated with a mold release agent on its surface which is provided with the ceramic green sheet 22. An internal electrode for the ultimate product (not shown) is printed on the surface of the ceramic green sheet 22 by screen printing or the like. The internal electrode may be alternatively formed after a cut sheet is obtained as described hereinafter.

Figure 2:
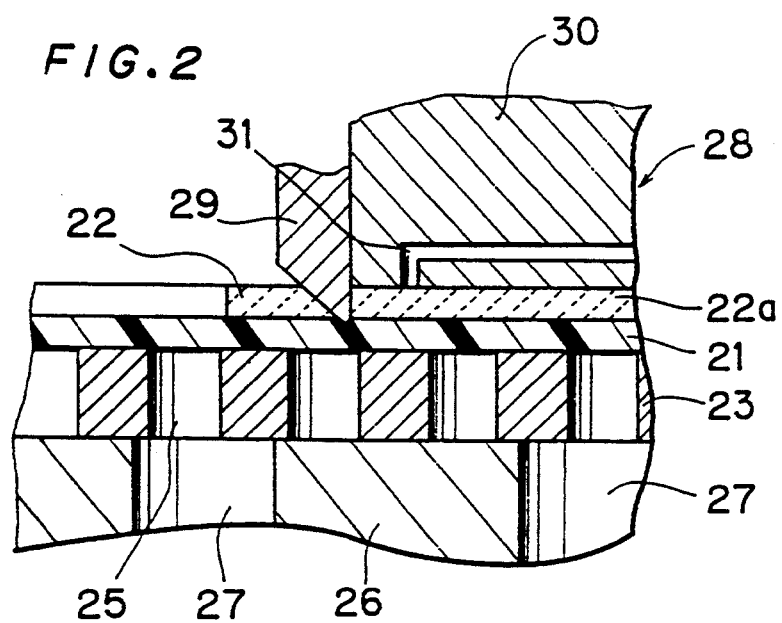
FIG. 2 is an enlarged sectional view showing the structure around a punching edge in the apparatus shown in FIG. 1.

The carrier film 21 and the ceramic green sheet 22 are placed on an endless belt 23, which is partially shown in FIG. 1, and carried along as indicated by arrow 24. Similarly to the aforementioned belt 4, this belt 23 is formed as a thin plate of a metal such as nickel and is provided with a large number of pores 25, as shown in FIG. 2. Other types of means for carrying the carrier film 21 and the ceramic green sheet 22 may be used in place of the belt 23. Further, such carrying means may be omitted.

The belt 23 is moved along the upper surface of a surface plate 26. The surface plate 26 is provided with a plurality of suction holes 27. Negative pressure is applied to the suction holes 27 from a vacuum source (non shown) and then applied to the carrier film 21 through the pores 25, thereby to locate the carrier film 21 on the surface plate 26. While negative pressure is applied to the suction holes 27, the belt 23 carries the ceramic green sheet 22 and the carrier film 21 by a prescribed distance in the direction of arrow 24.

A pickup apparatus 28 is positioned above the surface plate 26. The pickup apparatus 28 has a punching edge 29 at its periphery and is provided with a suction head 30 at a portion thereof enclosed by the punching edge 29. A plurality of suction holes 31 are formed in the lower surface of the suction head 30. The suction force applied to the suction holes 31 is stronger than that applied to the aforementioned suction holes 27 of the surface plate 26.

The pickup apparatus 28 is vertically movable, as shown by arrow 32. The punching edge 29 is also movable along the direction indicated by the arrow 32 with respect to the suction head 30.

In order to cut out a cut sheet 22a having constant dimensions from the ceramic green sheet 22 which has been located in the aforementioned manner, the pickup apparatus 28 is moved downward. The lower end of the punching edge 29 is projected from the lower surface of the suction head 30, and the length of such projection is selected to slightly exceed the thickness of the ceramic green sheet 22, as shown in FIG. 2. Thus the punching edge 29 completely cuts the ceramic green sheet 22, while also incompletely cutting the carrier film 21. To this end, the carrier film 21 preferably has higher shearing stress as compared with the ceramic green sheet 22 and hardness such that it does not cause the punching edge 29 to break.

When the punching edge 29 cuts the ceramic green sheet 22 as shown in FIG. 2, a cutting line having a closed outline is defined in the ceramic green sheet 22. Then, suction force is applied to the suction holes 31 provided in the suction head 30 and the pickup apparatus 28 is upwardly moved so that a cut sheet 22a enclosed by the cutting line is taken out from the remaining part of the ceramic green sheet 22. FIG. 1 shows this operation. Adhesion between the carrier film 21 and the ceramic green sheet 22 is so selected so that the cut sheet 22a can be lifted off the carrier film 21 by the aforementioned upward movement of the pickup apparatus 28.

A plurality of cut sheets 22a taken out by the pickup apparatus 28 as shown in FIG. 1 are sequentially stacked similarly to the aforementioned prior art. In carrying out such stacking, preferably the lower end of the punching edge 29 is not projected from the lower surface of the suction head 30. A desired laminated ceramic capacitor is obtained through steps similar to those in the aforementioned prior art process.

According to the present invention, the ceramic green sheet 22 is continuously adhered to the carrier film 21 until, as discussed above, the cutting line having a closed outline is defined by the punching edge 29. Therefore, the ceramic green sheet 22 can be prevented from deformation, breakage and wrinkling even if it is thin. This improves the cutting accuracy so as to improve the production yield of laminated ceramic capacitors as the result.

The punching edge 29 is applied deeply enough to at least reach the surface of the carrier film 21, whereby the ceramic green sheet 22 can be completely cut even if the punching edge 29 has relatively low straightness. Further, the forward end of the punching edge 29 is not brought into contact with the metal belt 23, but merely with the carrier film 21, so that substantially no damage is caused to the punching edge 29, whereby its life can be extended. In addition, inconvenience caused by chipping of the punching edge 29 can be also avoided.

The negative pressure which is supplied through the suction holes 27 provided in the surface plate 26 and the pores 25 provided in the belt 23 is directly applied to the carrier film 21. Thus, such negative pressure will cause no deformation of the ceramic green sheet 22 to be cut, whereby the ceramic green sheet 22 can be cut in a correct position also in this sense.

According to another aspect of the invention, an extremely thin ceramic green sheet, which is not more than 30 μm in thickness, for example, may be also employable in the present invention. Such a thin ceramic green sheet is easily wrinkled when the cut sheet is removed from the remaining part of the ceramic green sheet by suction. With the suction head 30a shown in FIG. 3, it is possible to take out an extremely thin cut sheet by suction substantially with no wrinkling.

Figure 3:
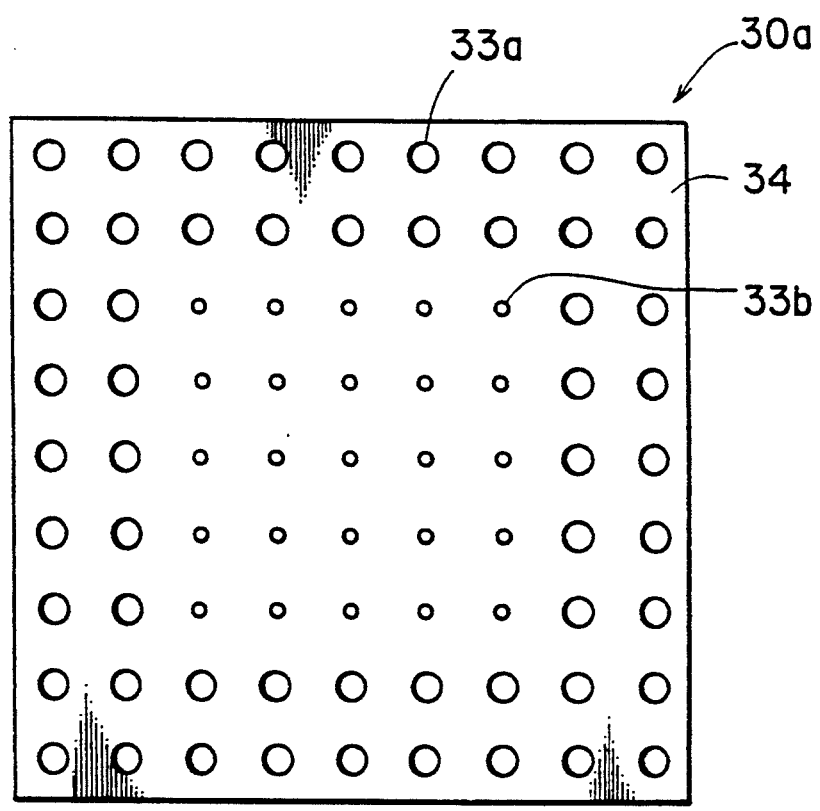
FIG. 3 is a bottom view showing a preferable state of distribution arrangement for suction holes formed in a suction head.
Figure 4:
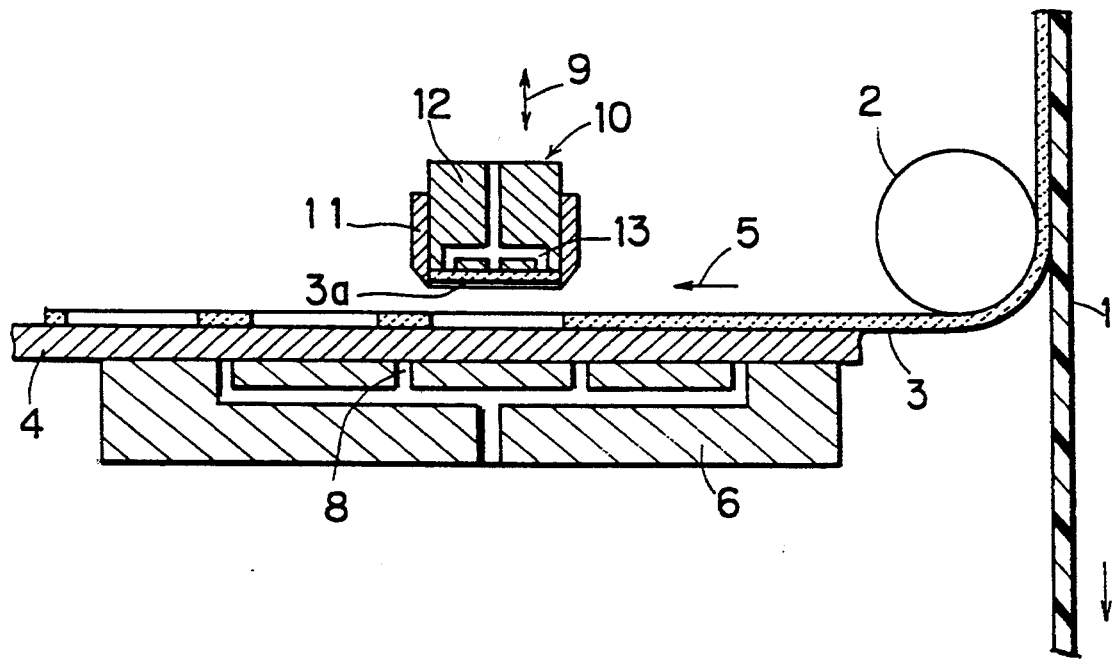
FIG. 4 is a sectional view corresponding to FIG. 1, which shows a conventional apparatus for cutting out a sheet cut.
Figure 5:
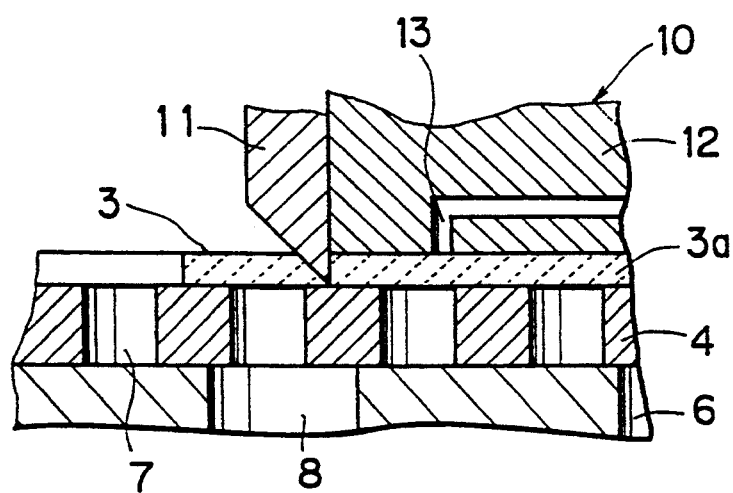
FIG. 5 is an enlarged sectional view corresponding to FIG. 2, which shows a part of the apparatus shown in FIG. 4.

Referring to FIG. 3, a plurality of suction holes 33a and 33b are distributed in a perforated surface 34 of the suction head 30a which is in contact with the cut sheet. The suction holes 33a and 33b, distributed around the outer periphery of the perforated surface 34 are 0.8 mm in diameter, for example, and those distributed around the central portion are 0.3 mm in diameter, for example. In other words, the suction holes 33a distributed around the outer periphery of the perforated surface 34 are larger in diameter than the suction holes 33b distributed around the central portion. Thus, the suction force acting through the perforated surface 34 is stronger in the portion around the outer periphery than in the central portion.

The carrier film employed in the present invention is not restricted to a polyester film but another type of resin film is also employable. Preferable properties of the carrier film are higher shearing stress as compared with the ceramic green sheet, hardness causing no breakage of the punching edge, low deformability against tensile force, and low deformability against heat which is applied in the step of drying the ceramic green sheet, the internal electrode, and the like.

While the above embodiment has been described with reference to a ceramic green sheet, the present invention is also applicable to another type of weak sheet.

Although an embodiment of the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of cutting out a cut sheet having predetermined dimensions from a weak sheet, said method comprising the steps of:
    forming a release layer of a mold release agent on a carrier film;
    forming a weak sheet on the release layer ;
    moving said weak sheet onto a base surface plate with said carrier film interposed between said weak sheet and said base surface plate;
    applying a punching edge to said weak sheet to punch through said weak sheet and said release layer and to at least reach said carrier film, thereby defining a continuous cutting line to form a cut sheet and a remaining part in said weak sheet wherein said carrier film is incompletely cut punching edge as it punches through said weak sheet and
    removing said cut sheet from the remaining part of said weak sheet and said carrier film by suction, while applying a stronger suction force to a peripheral portion of said cut sheet than to a central portion of said cut sheet.

2. A method in accordance with claim 1, wherein said weak sheet is a ceramic green sheet.

3. A method in accordance with claim 1, wherein said step of forming said sheet on said release layer includes a step of applying ceramic slurry onto said release layer in uniform thickness.

4. A method in accordance with claim 1, wherein said carrier film has higher shearing stress tolerance than said weak sheet and has a degree of hardness which does not cause breakage of said punching edge.

5. A method in accordance with claim 4, wherein said carrier film is a polyester film.

6. A method in accordance with claim 1, wherein said steps of defining said cutting line and removing said cut sheet by suction are carried out by a step of providing a suction source with said punching edge at its periphery said suction source thereby being enclosed by said punching edge.

7. A method in accordance with claim 1, wherein said weak sheet is a ceramic green sheet with substantially uniform thickness; and said carrier film is a polyester film having higher shearing stress tolerance than said green sheet; said carrier film also having a degree of hardness which does not cause substantial breakage of said punching edge when said punching edge is applied to punch through said weak sheet and at least reach the surface of said carrier film.

8. A method in accordance with claim 1, wherein said weak sheet is an extremely thin ceramic green sheet no more than about 30 microns thick.

9. A method in accordance with claim 1, further comprising a step of applying a suction force to locate said carrier film with respect to said base surface plate.

10. A method in accordance with claim 1, wherein said weak sheet and said carrier film are moved onto said base surface plate by a belt interposed between said carrier film and said base surface plate.

11. A method in accordance with claim 10, wherein said belt is endless.

12. A method in accordance with claim 10, wherein a plurality of said cut sheets are cut out of an elongated weak sheet which is formed on a corresponding elongated carrier film, and carried by said belt to a corresponding plurality of positions on said base surface plate.

13. A method in accordance with claim 12, wherein said belt is endless.

14. A method in accordance with claim 1, wherein said weak sheet is directly accessible to ambient atmosphere and to said punching edge, with no additional carrier film interposed over said weak sheet.

15. A method of cutting out a cut sheet having predetermined dimensions from a weak sheet, said method comprising the steps of:
    forming a release layer of a mold release agent on a carrier film;
    forming a weak sheet on the release layer;
    moving said weak sheet onto a base surface plate with said carrier film interposed between said weak sheet and said base surface plate;

applying a punching edge to said weak sheet to punch through said weak sheet and said release layer and to at least reach said carrier film, thereby defining a continuous cutting line to form a cut sheet and a remaining part in said weak sheet wherein said carrier film is incompletely cut by said punching edge as it punches through said weak sheet;

removing said cut sheet from the remaining part of said weak sheet and said carrier film by suction from a suction head;

having said punching edge disposed at its periphery which encloses said suction head ; and applying a stronger suction force to a peripheral portion of said cut sheet than to a central portion, by providing larger suction holes in a peripheral portion of a perforated surface of said suction head, than in a central portion thereof.

16. A method in accordance with claim 15, wherein said weak sheet is an extremely thin ceramic green sheet no more than about 30 microns thick.

17. A method in accordance with claim 15, wherein said suction holes provided in said peripheral portion of said perforated surface of suction head are 0.8 mm in diameter and said suction holes provide in said central portion of said suction head are 0.3 mm in diameter.

18. A method of cutting out a cut sheet having predetermined dimensions from a weak sheen, said method comprising the steps of:

forming a release layer of a mold release agent on a carrier film;

forming a weak sheet on the release layer;

applying a punching edge to punch through said weak sheet and said release layer and form a continuous cutting line in said weak sheet, thereby defining a cut sheet and a remaining part;

wherein said carrier film is incompletely cut by said punching edge as it punches through said weak sheet and applying a first suction force to a peripheral portion of said cut sheet and applying a second suction force which is substantially weaker than said first suction force to a central portion of said cut sheet, thereby removing the cut sheet from the carrier film and from the remaining part of said weak sheet by suction.

19. A method as in claim 18, further comprising the step of peeling the cut sheet off of the carrier, starting with the peripheral portion of the cut sheet.

20. The method of claim 18, wherein said weak sheet is an extremely thin ceramic green sheet no more than about 30 microns thick.

* * * * *